US008724795B1

(12) United States Patent
Aldrich et al.

(10) Patent No.: US 8,724,795 B1
(45) Date of Patent: May 13, 2014

(54) PROBLEM CENTRIC KNOWLEDGE MANAGEMENT TOOL FOR CALL CENTER

(75) Inventors: Daniel J. Aldrich, Mission, KS (US); Ryan A. Studer, Lee's Summit, MO (US); Thomas S. Sullivan, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 314 days.

(21) Appl. No.: 13/043,636

(22) Filed: Mar. 9, 2011

(51) Int. Cl.
*H04M 3/00* (2006.01)

(52) U.S. Cl.
USPC ..................................................... 379/265.02

(58) Field of Classification Search
USPC ..................................... 379/265.02; 705/304
See application file for complete search history.

(56) References Cited

U.S. PATENT DOCUMENTS

| | | | | |
|---|---|---|---|---|
| 7,826,597 | B2 * | 11/2010 | Berner et al. ................ | 379/1.01 |
| 2004/0042611 | A1 * | 3/2004 | Power et al. ............ | 379/265.02 |
| 2007/0133780 | A1 * | 6/2007 | Berner et al. ............ | 379/265.01 |
| 2008/0118052 | A1 * | 5/2008 | Houmaidi et al. ....... | 379/265.11 |
| 2008/0195659 | A1 * | 8/2008 | Rawle ........................ | 707/104.1 |
| 2008/0195897 | A1 * | 8/2008 | Alaniz et al. .................... | 714/46 |
| 2010/0077008 | A1 * | 3/2010 | Davis et al. ................... | 707/797 |
| 2012/0303787 | A1 * | 11/2012 | Fan et al. ...................... | 709/223 |
| 2012/0321071 | A1 * | 12/2012 | Fisher, Jr. ................ | 379/265.09 |

* cited by examiner

*Primary Examiner* — Sonia Gay

(57) ABSTRACT

A call center problem resolution system is provided. The system comprises, a computer system comprising at least one processor and a memory, a data store coupled to the computer, and an application stored in the memory. When executed by the processor, the application receives call information comprising a calling number, and it retrieves communication equipment information based on the calling number, communication service plan information based on the calling number, and communication network operations information based on the communication service plan information. When executed, the application further receives words describing a problem experienced by communication equipment associated with the calling number. Based on the plurality of words describing the problem, the communication network operations information, the communication service plan information, and the communication equipment information, the application identifies a plurality of information items, and presents the plurality of information items in a prioritized order to a call agent.

18 Claims, 5 Drawing Sheets

PROBLEM CENTRIC KNOWLEDGE MANAGEMENT TOOL FOR CALL CENTER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication over networks of specialized base stations known as cell towers or sites. In addition to the standard voice function of a mobile telephone, current mobile phones and other similar portable electronic devices may support additional services including short message service (SMS) for text messaging, electronic mail, and packet switching for access to the Internet. Other services include gaming, Bluetooth™, infrared, camera with video recorder, multimedia messaging services (MMS) for sending and receiving photographs and downloading of video, MPEG-1 Audio Layer 3 (MP3) for audio storage, radio, and global positioning system services. Current mobile telephones and other portable electronic devices connect to cellular networks consisting of switching points and base stations owned by mobile network operators. Mobile phones, personal digital assistants (PDA), and other similar devices also may provide for memorandum and document recording, personal organizer and personal digital assistant functions, and instant messaging services, and may serve as wireless modems for personal computers and as a console to online games. Mobile network operators may provide support for their customers by using call centers to receive calls concerning a wide range of customer needs. The call centers may receive high volumes of calls and employ numerous service agents to handle the calls. The mobile network operators may further provide computer systems and software applications as tools for their call center service agents to use to increase efficiency or timeliness of support or accuracy of problem resolution.

SUMMARY

In an embodiment, a call center problem resolution system is disclosed. The call center problem resolution system comprises a computer system comprising at least one processor and a memory, a data store coupled to the computer system, and an application stored in the memory. The application, when executed by the processor, receives call information comprising a calling number, wherein the call is directed to a call center. The application further retrieves communication equipment information based on the calling number, retrieves communication service plan information based on the calling number, and retrieves communication network operations information based on the communication service plan information. The application further receives a plurality of words describing a problem experienced by communication equipment associated with the calling number. Based on the plurality of words describing the problem, based on the communication network operations information, based on the communication service plan information, and based on the communication equipment information, the application identifies a plurality of information items, and presents the plurality of information items in a prioritized order to a call agent.

In an embodiment, a method of addressing problem reports in a call center is disclosed. The method comprises receiving a call reporting a communication problem, automatically determining a calling number of the call based on a call origination message, and retrieving communication equipment information based on the calling number from a data store containing information about communication equipment provisioned to receive communication service. The method further comprises retrieving communication service plan information based on the calling number from a data store containing information about communication customer accounts, retrieving billing information based on the calling number from a data store containing information about a current account balance associated with the calling number, and retrieving communication network operations information from a network management system based on the communication equipment information. The method further comprises receiving a plurality of words at least in part describing a communication problem, and based on at least one of the plurality of words, the communication equipment information, the billing information, the communication network operations information, or the service plan information, identifying a plurality of information items, and presenting the information items in priority order.

In an embodiment, a method of providing customer care is disclosed. The method comprises receiving a first call to customer care and, based on a calling number associated with the first call, automatically establishing a context of the first call. The method further comprises automatically receiving words describing a first problem experienced with a first communication equipment associated with the first call, and based on the context of the first call and based on the words describing the first problem, searching in a knowledge management system for a prioritized list of potential problem resolutions and presenting the prioritized list of potential problem resolutions. The method further comprises storing the context of the first call, storing an actual problem resolution, analyzing the context of the first call and the actual problem resolution, and based on the analysis, updating the knowledge management system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
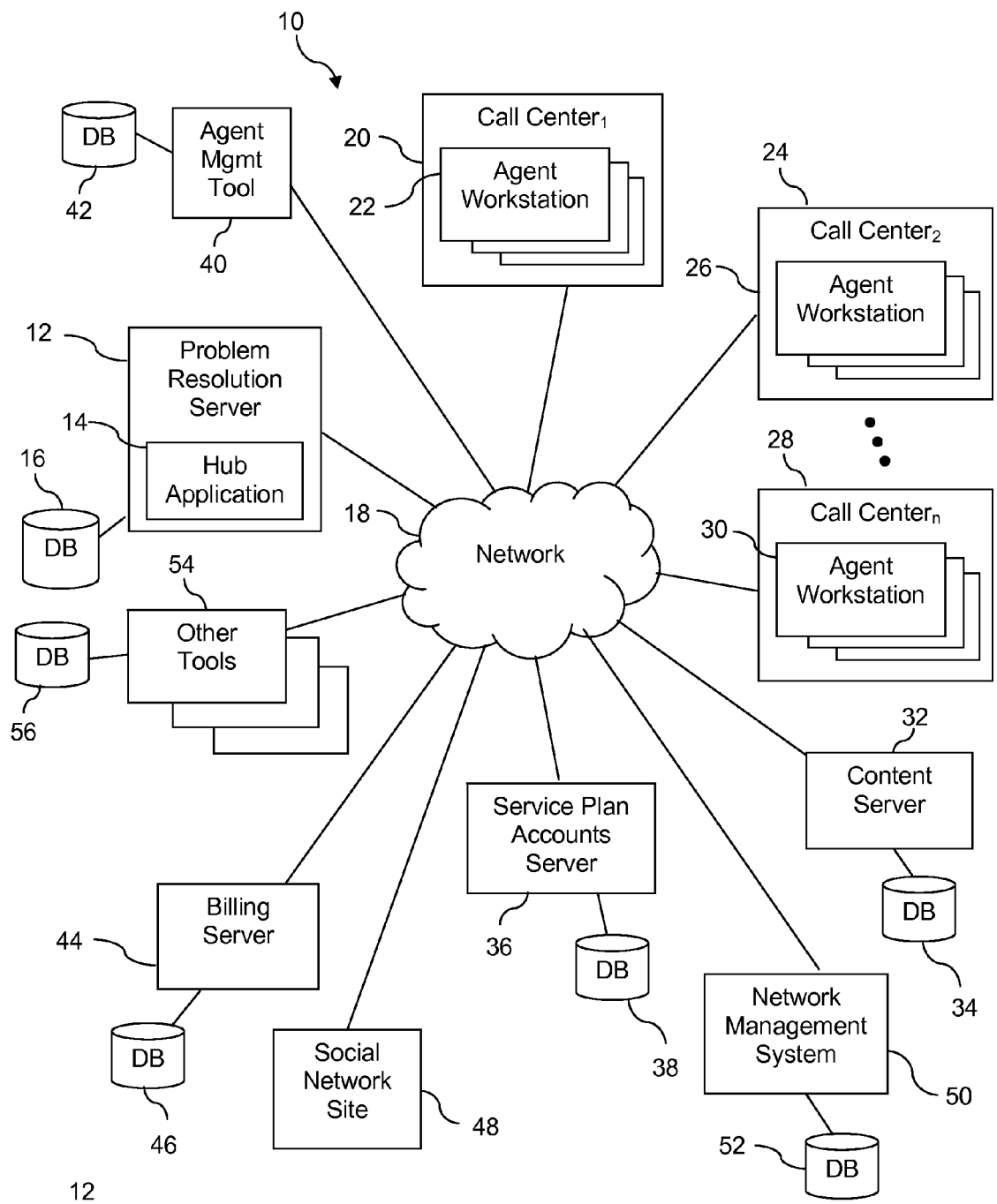
FIG. 1 is a block diagram of a problem resolution system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A problem resolution system used by call center service agents to provide customer care is described. In an embodiment, the problem resolution system supports an intelligent correlation of the information provided by a caller and/or a customer, problem scenario attributes, and textual information input by the call center service agent to information stored in the system that provide fast answers and/or solutions to customer problems. The information stored in the problem resolution system that is correlated with the information provided by the customer, scenario attributes, and information entered by the agent may further be filtered to specifically support the problem and/or operational scenario. Information provided by a caller or a customer describing some symptoms of a problem experienced with communication equipment may be entered by a call center service agent into the problem resolution system while the agent is handling a call at a workstation in a call center. Alternatively, a voice recognition function may capture information from a customer care call and display it for the call center service agent at the workstation or automatically enter some of this information into the problem resolution system. For example, such a voice recognition system may present text at the workstation representing one or more of the words spoken by a customer describing a communication problem, and the call center service agent may use an interface on the workstation to designate selections of the text to be entered or stored into the problem resolution system. The communication equipment that experienced the problem may be one or more of a mobile phone, or a personal digital assistant (PDA), or a media player, or other mobile electronic device. Other mobile devices may include, but are not limited to, air cards, WiFi hotspots, and other devices.

Additional information may be retrieved automatically by the system based on the phone number of the customer. The phone number of the customer may be determined based on the calling number of the caller or based on a calling number provided by the customer, for example if the customer contacts customer care through an on-line customer care web site or calls from an unrelated phone about their own phone that is associated with the calling number. Further information may also be automatically retrieved by the system based on the status of the communication network operations during the time of the problem. Using at least some of the information provided by the caller or the customer, or information retrieved by the system, the system may present a plurality of information items in a prioritized order to the agent. In an embodiment, the information items may be one or more of a list of trouble shooting steps, or a group of follow up questions to provide additional information about the problem, or actions to solve the problem, or resources that may have information pertaining to the problem or its resolution. For example, a call center service agent may enter into a knowledge management application some of the words or phrases used by a caller to describe a problem experienced with a mobile device. Based on the caller's phone number the application may automatically retrieve information about a mobile device associated with the caller's account and/or information about the caller's account history. The information retrieved about the phone may be one or more of the phone manufacturer, or the model name, or the electronic serial number (ESN), or the mobile subscriber identity (MSID). The information about the caller's account may be one or more of their service plan, a history of their previous calls to the call center and resolutions of those calls, their account balance, or their length of time as a customer. The application may further automatically retrieve information about the status of the wireless communication network used by the mobile device while the problem symptoms were experienced. Based on the words or phrases entered or selected by the call agent and/or the information automatically retrieved, the application may present a prioritized list of information items or actions that the call agent or the customer may use to resolve the problem.

The prioritized list of information items may be generated at least in part by the application using some of the words or phrases entered or selected by the call agent to search a knowledge dictionary. The words or phrases entered or selected by the call agent to describe the symptoms of the problem may also be used by the application to search a synonym table for additional words or phrases that can be used to search the knowledge dictionary. The knowledge dictionary may comprise information about communication equipment, communication networks, and/or communication services. The information in the knowledge dictionary may be tagged for searching based on the context associated with a call. The context may comprise the calling number, information about the communication equipment, the communication service plan, the communications network operations, and/or a word or words or phrases describing some of the symptoms of the problem.

Some of the information stored in the knowledge dictionary may be submitted by call center agents and/or some of the information may be obtained from other sources. In an embodiment the system may prioritize the search results from the knowledge dictionary based on how quickly and/or how successfully previous calls with similar symptoms were resolved. Success may be determined based on how seldom follow-up calls were received from customers experiencing repeated problems with the same symptoms or by some other metric related to the occurrence of symptoms experienced by the caller. If sufficient history concerning the speed or success rate of potential problem resolutions is not yet available, the search results may be prioritized using other criteria such as the identity of the agent, the identity of the source that contributed the information to the knowledge dictionary, and/or the speed or success rate of prior contributions by the contributing agent or the information source for other problem symptoms.

Call center agents may be organized into different groups or service organizations. In an embodiment the problem resolution system may present search results from the knowledge dictionary and/or information that was automatically retrieved based on the calling number in a format or in an order that is customizable for a particular group or service organization or individual agent.

Turning now to FIG. 1, a communication equipment problem resolution system 10 is described. In an embodiment, the system 10 comprises a problem resolution server 12, a network 18, a network management system (NMS) 50, a content server 32, a service plan accounts server 36, a billing server 44 and an agent management tool 40. In some contexts, the system 10 or portions of the system 10 may be referred to as a knowledge management system. In an embodiment, the problem resolution server 12 may comprise a data store 16 and a hub application 14 stored in memory of the problem resolution server 12. The hub application 14 may execute automatically when a call is received at a first call center 20, or when a first agent workstation 22 receives a call at a first call center 20. The hub application 14 may also be executed when a call is received at a second call center 24 or when a second agent workstation 26 receives a call at a second call center 24. The first agent workstation 22 may be a computer and a headset or other voice call handling device, for example a desk phone. Computers are discussed in more detail hereinafter.

It is understood that there may be any number of call centers 20, 24 or 28 that may receive calls and any number of agent workstations 22, 26 or 30 at these call centers and that the hub application 14 may be activated for calls to any of these call centers or for calls handled at any of these agent workstations. In an embodiment, the network 18 couples the first call center 20 to the communication equipment problem resolution system 10, and the network 18 also enables the hub application 14 to communicate with any of the other components of the communications equipment problem resolution system 10. The network 18 may be a private communication network, a private data network, a virtual private network, a public communication network, a public data network, or any combination thereof. The network 18 may be a local area network (LAN) or a wide area network (WAN) or a cloud network or any combination thereof.

The network management system (NMS) 50 may comprise hardware or software or a combination thereof. The network management system 50 may provide a variety of information describing the status or operational condition of a communication network that provided service when the communication equipment exhibited a symptom or symptoms. For example, the network management system 50 may indicate when an underground cable that was part of a major communication link was accidentally cut causing an interruption of phone and/or internet services. For another example, the network management system 50 may indicate that a server providing voice mail services to some customers has crashed causing an interruption or delay in providing services.

The content server 32 may provide access to information or content that may be requested or referenced by the hub application 14. For example, the content server 32 may provide access to one or more of a group of documents describing actions to take when trouble shooting symptoms on certain types of communication equipment, a group of documents explaining lessons learned on certain types of communication equipment, or user's manuals for certain types of communication equipment. The content server 32 may further provide a list of frequently asked questions about certain types of communication equipment and their answers, a BLOG associated with mobile devices, a customer feedback site operated by a communication service provider or mobile network operator, a site operated by customer care agents for use by customer care agents, or any text or information that may be useful in resolving the customer's communication equipment problem. While only a single content server 32 is depicted, it is understood that any number of content servers could be accessed by the hub application 14.

The service plan accounts server 36 may provide information to the hub application 14 concerning the customer's account associated with the communication equipment or phone number experiencing the problem symptoms. The service plan accounts server 36 may provide information about one or more of the specific communication equipment that are included in the customer's plan, the equipment model numbers that are associated with the customer's plan, or the services that are provided for the communication equipment included in the customer's plan. The service plan accounts server 36 may further provide any passwords or permission needed to access the services included in the customer's plan, speed or data transmission specifications or limitations associated with the customer's plan, the minimum capability needed for compatibility of the communication equipment with the services covered by the customer's plan, or any other information concerning the customer's account that might be useful in resolving the symptoms described by the customer. The service plan accounts server 36 may provide information about the history of calls by the customer to a call center about problems or symptoms and their resolution. The communication equipment associated with the customer's account may be one or more of a mobile phone, a personal digital assistant (PDA), a media player, or other electronic device.

The billing server 44 may provide information to the hub application 14 concerning the status or history or value of the customer's financial account. The billing server 44 may provide one or more of the current financial status of the customer's account, how long the customer has had an account with the mobile network operator, the geographic location of the customer's billing address, the financial amount of the business done with the customer, or the financial amount of future business that may be affected or influenced by the customer. For example, the billing server 44 may provide information to the hub application 14 about a mobile device customer which indicates that the customer has called previously about similar symptoms experienced with their mobile device and what specific actions were taken or recommended to resolve the issue. In another example, the billing server 44 may provide information to the hub application 14 that the customer has a new account or has recently added some new communication equipment to their account. In either of these examples some of the information provided to the hub application 14 may be selectively displayed as information items at the first agent workstation 22. The order in which the information items are displayed may make a difference in how fast or how successfully the first service agent is able to troubleshoot or resolve the customer's communication problem.

In either of the above examples, the priority order of the information items presented by the hub application 14 for display at the first agent workstation 22 may be adjusted based on the information provided by the billing server 44. In the first example the specific actions taken previously may be de-prioritized since they did not appear to have prevented a recurrence of the same or similar symptoms. In the second example above, information items that have historically been most successful for new customers or new equipment users with similar symptoms may be highly prioritized.

The agent management tool 40 may provide information to the hub application 14 concerning a first agent working at the first call center 20 using the first agent workstation 22. Alternatively, the agent management tool 40 may provide information to the hub application 14 concerning a first agent who is associated with a first information item stored in the knowledge management system. The agent management tool 40 may provide information about one or more of the group or service organization to which the first agent is assigned, any performance metrics concerning the first agent such as average handle time (AHT) or first call resolution (FCR) rate or customer satisfaction ratings. The agent management tool 40 may further provide information about any training completed or any certification received by the first agent, any published documents by the first agent, and/or the length of time the first agent has worked in the first call center 20. In an embodiment, the problem resolution server 12 may request information from the agent management tool 40 to use in prioritizing the order and/or choosing a format for presentation of the information items on a display at the first agent workstation 22. For example, the hub application 14 may request from the agent management tool 40 the name of the service organization to which the first agent workstation 22 used by the first service agent handling a call is assigned.

The hub application 14 may further use that information to designate a particular display format at the first agent workstation 22 for presenting the information items identified as relevant for the symptoms described by the caller. In another example, the hub application 14 may request the identity of the first agent who authored or submitted a first information item in the knowledge management system and any performance metrics corresponding to that first agent. The specific values of performance metrics corresponding to the agent or agents who authored or submitted information items may be used by the hub application 14 to prioritize the order of the information items presented on a display at the first agent workstation 22. The agent management tool 40 may use one of proprietary software developed by the mobile network provider, commercially available software purchased by the mobile network provider, free software available to the mobile network provider, or any combination thereof.

Figure 2:
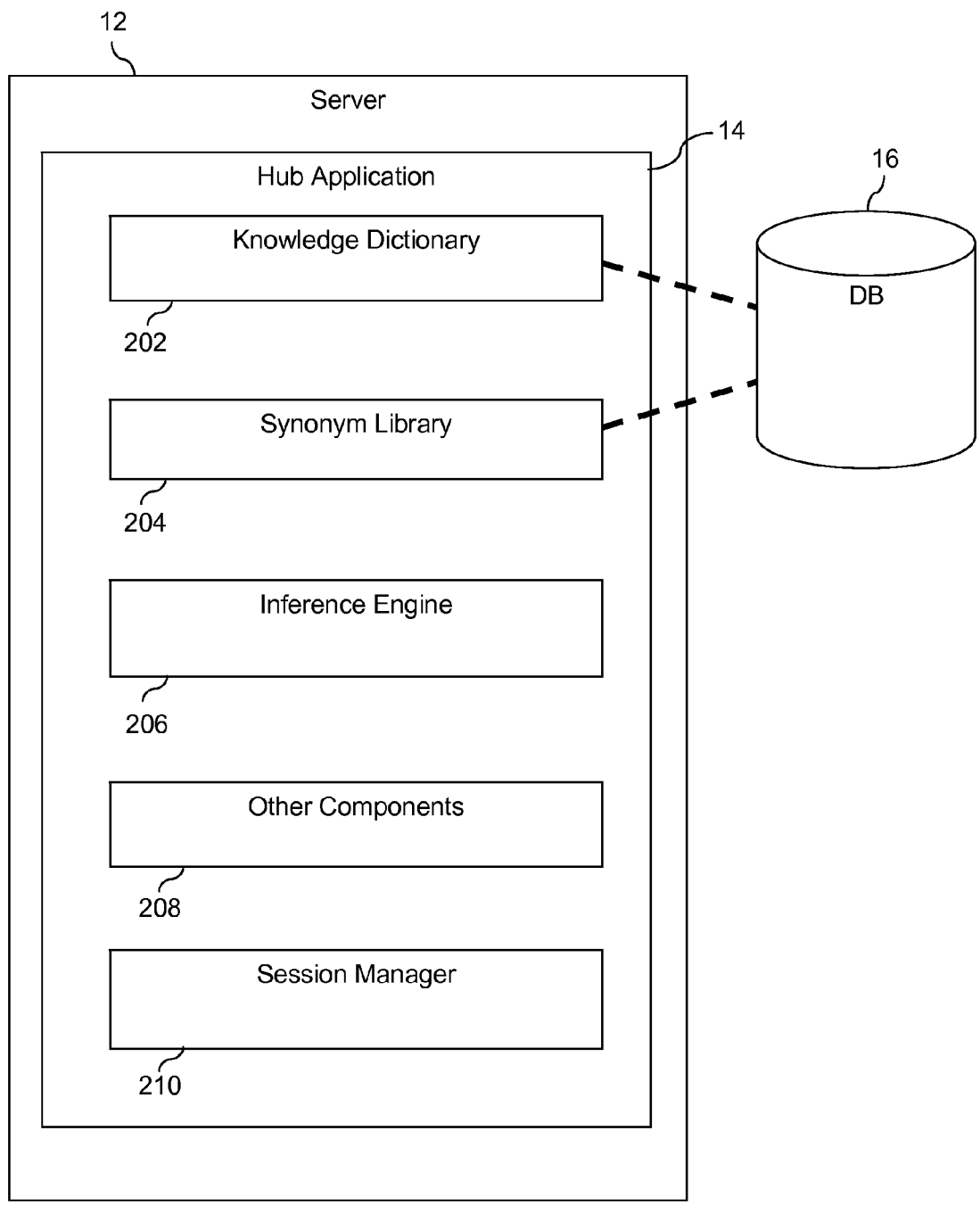
FIG. 2 is a block diagram of an exemplary Hub application according to an embodiment of the disclosure.

Turning now to FIG. 2, the hub application 14 executing on a problem resolution server 12 is described. In an embodiment, the hub application 14, may comprise a knowledge dictionary 202, a synonym library 204, an inference engine 206, and a session manager 210. The hub application 14 may also comprise other components 208. The hub application 14 may use one or more of the knowledge dictionary 202, the synonym library 204, the inference engine 206, the session manager 210, and/or other components 208 during the handling of a customer call to identify a plurality of information items and/or to prioritize a plurality of information items associated with a symptom or symptoms of a problem experienced by a customer using communication equipment.

In an embodiment, the session manager 210 may keep track of a first call center agent's activity on the first agent workstation 22 during a session with the hub application 14. For example, the session manager 210 may keep track of the plurality of information items identified by the hub application 14 for the problem symptoms entered by the first call center agent on the first agent workstation 22. The session manager 210 may also keep track of the contextual information automatically retrieved by the hub application 14 for the call being handled by the first call center agent using the first agent workstation 22. The session manager 210 may further keep track of the priority determined by the hub application 14 for the plurality of information items. The session manager 210 may keep track of to which organization or to which service group the first call agent or the first agent workstation 22 is assigned, and it may use that information to select a format for presenting the contextual information and the prioritized information items on the display of the first agent workstation 22.

The knowledge dictionary 202 and/or the synonym library 204 may be located within the hub application 14 as shown in FIG. 2, or they may be stored in the data store 16 coupled to the problem resolution server 12 and/or the hub application 14, or they may be located on a server, not shown, that is coupled by the network 18 to the problem resolution server 12 and/or the hub application 14, or they may be located in any combination thereof. The knowledge dictionary 202 may comprise information about communication equipment, networks, and/or services. In an embodiment the knowledge dictionary 202 may comprise one or more of a plurality of trouble shooting procedures, follow up questions to determine additional information, possible causes of specific symptoms, possible actions that can prevent specific symptoms from occurring, or descriptions of lessons learned from previous problems or symptoms. For example the knowledge dictionary 202 may comprise, at least in part, the meanings of specific error codes that may be displayed on a mobile device and/or recommended actions that the user of the mobile device may take in response to the error codes. In another example the knowledge dictionary 202 may comprise actions that the user of a mobile device may take in an attempt to restore lost functionality. If, for example, a mobile device has stopped showing caller id numbers for incoming calls, then the knowledge dictionary may indicate that removing the phone's battery and reinstalling it may restore the caller id functionality for the phone.

When the hub application 14 is automatically activated by a phone call to a first call center 20 or to a first agent working at a first agent workstation 22, the hub application 14 may receive a word or plurality of words or phrases describing a symptom or symptoms of a problem experienced on communication equipment when used by a customer. In an embodiment the knowledge dictionary 202 may have its contents or information items tagged with information by which the hub application 14 may search. This tagged information may comprise data about data or, as it is sometimes called, metadata. In an embodiment, the metadata tags may comprise one or more keywords which describe symptoms or that otherwise relate to symptoms. Metadata tags may further comprise contextual information which may help differentiate between problems or circumstances that can cause similar symptoms. As new information is added to the knowledge dictionary 202, for example as problems are resolved, information present in the knowledge dictionary 202 that may have contributed to resolving the problem may be tagged with one or more keys related to descriptive words spoken during the subject customer care call. Additionally, care agents may manually add metadata or update metadata associated with information in the knowledge dictionary 202 that they used in successfully resolving a problem. In this way, the value of the knowledge dictionary 202 may grow over time as agents use and tag the knowledge dictionary 202. The hub application 14 may search the knowledge dictionary 202 for information items whose metadata tags indicate a possible match to the word or plurality of words or phrases used by the caller to describe a symptom or symptoms. The hub application 14 may also retrieve information about the context of the symptoms described by the caller and look for possible matches of the context information to one or more of the metadata tags associated with the information items.

The synonym library 204 may comprise words or phrases that have similar or substantially equivalent meanings to other words or phrases. In an embodiment, the hub application 14 may search the synonym library 204 to find words or phrases that may be similar or substantially equivalent in meaning to one or more of the words or phrases used by a customer to describe a problem or symptoms of a problem experienced with communication equipment. The synonym library 204 may also comprise words or phrases that are not known to have similar or substantially equivalent meanings in general usage, but that have been used by different customers to describe similar or identical problems or symptoms. For example, a first customer may use a phrase such as "lost connection" and a second customer may use a phrase such as "the screen went blank" to describe problems that may have the same or similar root cause. In this example the hub application 14 may search the synonym library 204 for any matches to the phrase "lost connection", and may find the phrase "the screen went blank" and/or other phrases that may be used by the hub application 14 to search the knowledge dictionary 202.

In addition to the word or plurality of words or phrases used by the caller to describe a problem, the hub application 14 may find an additional word or words in the synonym library 204 that may be included when the hub application 14 searches the knowledge dictionary 202. The additional word or words found in the synonym library 204 may be used as a keyword or keywords to find matches to the metadata tags of information items stored in the knowledge dictionary 202. In an embodiment, the information items that match to the keywords may provide information about one or more of a root cause to the problem, a solution to the problem, or a list of actions to follow to troubleshoot the problem. The information items that match to the keywords may further provide information about questions to ask the customer to provide more information about the problem, the location or name of a resource that may have information about a solution to the problem, or a link to a site that may have information about a solution to the problem. By using the additional word or words found in the synonym library 204, the hub application 14 may find a match to one or more additional information items in the knowledge dictionary 202 that do not match to the word or plurality of words or phrases used by the caller to describe a problem.

The additional information items found using the additional word or words from the synonym library 204 may improve the speed or successfulness of the resolution to the communication problem experienced by the customer. For example, a customer may use the phrase "lost connection" to describe a problem with their mobile device. The hub application 14 may search the synonym library 204 for any word or words that are similar or substantially similar in meaning to the phrase "lost connection". The hub application 14 may find the additional phrases "dropped connection" and "blank screen" listed or described in the synonym library 204 as having meanings similar to that of the phrase "lost connection". The hub application 14 may further use the phrases "dropped connection" and "blank screen" in addition to the phrase "lost connection" to search the knowledge dictionary 202. In this example, the hub application 14 may find some information items whose metadata tags match to either "dropped connection" or "blank screen" but do not match to "lost connection". The hub application 14 may present one or more of the matching information items on the display of the first agent workstation 22. The first service agent may further use one of the information items that did not match to "lost connection", but did match to "dropped connection" or "blank screen" to successfully resolve the communication problem with the mobile device in a timely manner.

The inference engine 206 may use contextual information retrieved by the hub application 14 to determine words or phrases for the hub application 14 to use to search the knowledge dictionary 202 for information items. The words or phrases may not have been used by the customer or other customers in descriptions of problems but they may be more descriptive or lead to more useful results when searching the knowledge dictionary 202. The contextual information retrieved by the hub application 14 for the calling number of the customer may be one or more of information about the communication equipment, the service plan, or the network operations. In an embodiment, the inference engine 206 may be capable of inferring or identifying possible correlations between words or phrases when they are used in similar or identical contexts. These correlations may not have been known or used before because they may only apply in certain contexts. For example, a customer may describe a problem symptom as "cannot connect to my Bluetooth™", and the inference engine 206 may infer from previous successful problem resolutions for communication equipment using Bluetooth™ technology that the word "pair" may have a similar meaning to the word "connect". The word "pair" may be a term of art for Bluetooth™ connections that is not known to most customers and not used in most customers' problem descriptions, but it may lead to more useful results than the word "connect", for customers that use Bluetooth™ technology, when searching the knowledge dictionary 202.

A high volume of customer calls to a first call center 20, potentially thousands a day for a first service agent working at the first agent workstation 22, may limit the amount of time that the first service agent can spend on a service call. The limited amount of time may make it impractical or undesirable for the first service agent to manually enter into the communication equipment problem resolution system 10 a thorough or carefully worded description of a communication problem experienced by the customer. The limited amount of time may also make it impractical or undesirable for the first service agent to manually search one or more data stores for information on the customer's account, the customer's service plan, or the status of the communication network. The limited amount of time may further make it impractical or undesirable for the first service agent to query or search one or more data stores for potential solutions, lessons learned or troubleshooting steps, and then read one or more of the articles, documents, or lists found by the query or search. The limited amount of time may create a need for quickly finding actionable information, or information that can be used to take action, in resolving a customer's communication problem. In an embodiment, the hub application 14 may display a prioritized list of information items, or actionable information, at the first agent workstation 22 before and/or during the time when the first service agent is handling a call from a customer. The prioritized list of information items may enable the first service agent to successfully resolve the customer's communication problem in a timely manner.

In some call center environments, call agents may handle a high volume of calls, for example, up to 3,000 calls per day or more during a single daily work shift. It will be appreciated that such a call handling environment may be associated with operating constraints. For example, in such an environment it may not be possible for a call agent to open a standard problem ticket and enter a description of the customer problem and a description of the problem resolution. In other environments such a description of a customer problem may include an identification of the customer account, a phone number of a mobile device experiencing a problem, a brief description of the problem experienced by the customer, and possibly other information. There simply is not time to invoke a user interface of the agent workstation 22 and enter this information 3,000 times or more per day. The system 10 described above may capture and save information about the call automatically, thereby reducing the burden of the call agent.

Figure 3:
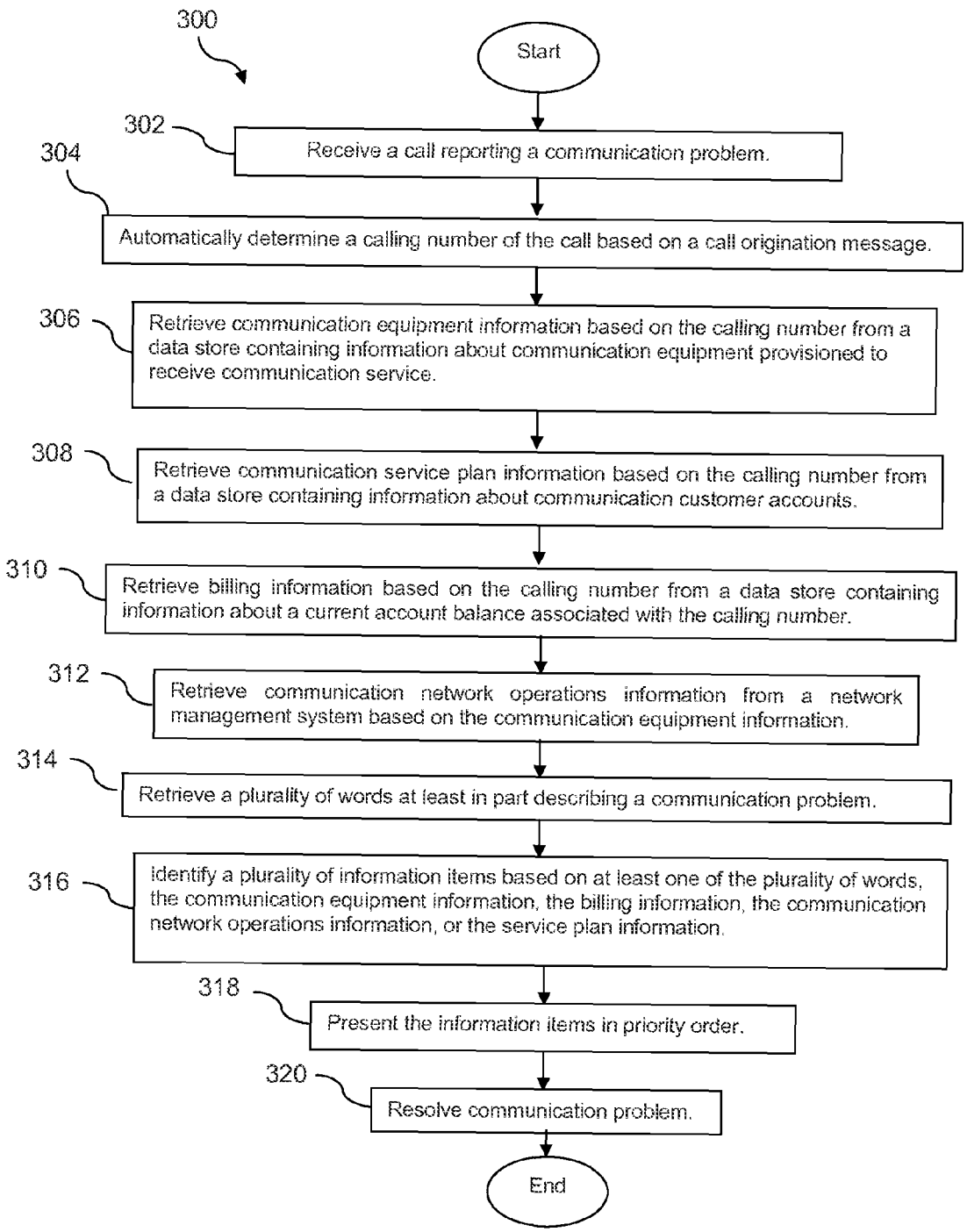
FIG. 3 is a flow chart of a method according to an embodiment of the disclosure.

Turning now to FIG. 3, a method 300 for addressing a problem report to the call center 20 is described. At block 302, a call reporting a communication problem is received at the first call center 20. In an embodiment, the incoming call may be assigned to or transferred to the first agent working at the first agent workstation 22. At block 304, a calling number associated with the incoming call is automatically determined based on information in the call origination message associated with the incoming call, for example a caller id field. In an embodiment, the calling number associated with the call may comprise one of the calling number that is identical to the calling number originating the incoming call, a calling number that is listed on the same account as the originating call number, or a calling number that is listed on another account belonging to the owner of the originating call number. In an example, the calling number associated with the call may be selected by the caller or the first call agent from a list of possible calling numbers associated with the call origination number that is automatically retrieved and/or compiled from a data store 46 or 38. The list of possible calling numbers may be presented visually on a display at the agent workstation 22 or it may be presented audibly to the first caller or to the first service agent working at the agent workstation 22.

At block 306, communication equipment information is retrieved from a data store (not shown) containing information about communication equipment provisioned to receive communication service. In an embodiment, the communication equipment information may comprise one or more of the name of the original manufacturer, the equipment model number, an electronic serial number, a firmware version identifier, a technology generation identifier, the manufacture date, or any other information about the communication equipment that may be useful when the hub application 14 retrieves or prioritizes information items related to the symptoms described by the caller.

At block 308, communication service plan information is retrieved based on the calling number from the data store 38 containing information about customer accounts. In an embodiment, the communication service plan information may comprise one or more of a geographical area where communication service may be available, a communication data transfer rate that is available, a communication protocol that is used, a communication feature and/or service that is supported, or any other communication service plan information that may be useful when the hub application 14 retrieves or prioritizes information items related to the symptoms described by the caller.

At block 310, billing information is retrieved based on the calling number from the data store 46 containing information about a current account associated with the calling number. In an embodiment, the billing information may comprise one or more of a current account balance, a history of account balances, or a monthly billing amount. The billing information may further comprise a history of billing amounts, an estimate or projection of possible future billing amounts, or any other account billing information that may be useful when the hub application 14 retrieves or prioritizes information items related to the symptoms described by the caller.

At block 312, communication network operations information is retrieved from the network management system (NMS) 50 or the network management system (NMS) data store 52 based on the communication equipment information retrieved at block 306. In an embodiment, the network operations information may comprise one or more of the network configuration, the network performance, the number and/or type of network alerts, or the number and/or type of network faults. The network operations information may further comprise the health and/or status of individual network elements, maintenance or repair actions, the amount of network use and/or network traffic, or any other communication network information that may be useful when the hub application 14 retrieves or prioritizes information items related to the symptoms described by the caller.

At block 314, a plurality of words is retrieved, or selected from a list, at least in part describing a communication problem. In an embodiment, the plurality of words may comprise one or more of words used by the caller to describe a communication problem or some of its symptoms, words entered by a first call agent working on a first agent workstation 22, words retrieved from a synonym library 204, words identified by an inference engine 206, or words selected from a list by the first call agent working on the first agent workstation 22. For example, voice recognition technology may be used to automatically create a list of words and/or phrases mentioned by the caller and this list may be displayed at the first agent workstation 22. The first call agent working at the first agent workstation 22 may further select or highlight one or more of the displayed words or phrases to designate them for use by the hub application 14.

At block 316, a plurality of information items is identified based on at least one of the plurality of words retrieved or selected at block 314, the communication equipment information retrieved at block 306, the billing information retrieved at block 310, the communication network operations information retrieved at block 312, or the communication service plan information retrieved at block 308. The plurality of information items may comprise one or more of a list of troubleshooting steps, a group of follow up questions to provide additional information about the problem, actions to solve the problem, or resources that may have information pertaining to the problem or its resolution.

At block 318, the information items identified at block 316 are presented in a prioritized order on a display at the first agent workstation 22. In an embodiment, the information items may be prioritized based on how quickly and/or how successfully previous calls with similar symptoms were resolved. Success may be determined by how seldom follow-up calls were received from customers experiencing repeated problems with the same symptoms or by some other metric related to the occurrence of symptoms experienced by a caller. If sufficient history concerning the speed or success rate of potential problem resolutions is not yet available, the information items may be prioritized using other criteria such as the identity of the agent or the identity of the source that contributed the information item, and/or the speed or success rate of prior contributions by the contributing agent or the information source for other problem symptoms.

In an embodiment, the information items may be prioritized based on the contextual information retrieved in block 306, block 308, block 310, and/or block 312. For example, the caller may experience a communication problem when using a cell phone that is made by a specific manufacturer, "A", and the information items may be prioritized in an order according to their success rate when used to resolve problems experienced on phones made by manufacturer "A". In another example, the caller may experience a communication problem when using a cell phone of model "X" when the communication network is experiencing a high level of usage, and the information items may be prioritized in an order according to their average speed of problem resolution for callers using cell phones of model "X" when the communication network is experiencing high levels of usage.

At block 320, the customer's communication problem with communication equipment may be resolved. In an embodiment, the communication problem may be resolved using, at least in part, one or more of the prioritized information items presented at block 318. The communication problem may be resolved by teaching or giving the customer information on how to use a feature of the communication equipment, telling the customer how to change or reset a setting on the communication equipment, ordering a replacement for the communication equipment to be sent to the customer, persuading the customer that there is not actually a problem with the communication equipment but instead the symptoms they have experienced are due to some other issue, or taking some other action based on one or more of the prioritized information items. For example, a customer may have a problem with their mobile device using battery power too quickly. One of the prioritized information items displayed at the first agent workstation 22 may indicate that the customer has a Bluetooth™ feature on their phone and that leaving the Bluetooth™ feature enabled when it is not needed will use up battery power at a fast rate. The service agent may then explain to the customer how to disable the Bluetooth™ feature on their mobile device and recommend that it be disabled whenever it is not needed.

For another example, a customer may report a problem of not being able to connect to the internet using their mobile device. One of the prioritized information items displayed at the first agent workstation 22 may indicate that the customer has a service plan that does not include internet access. The service agent may then explain to the customer that there is not an actual problem with their mobile device, and suggest that they may wish to change to a service plan that does provide internet access. For another example, a customer may report a problem with being disconnected during calls on their mobile device when they are at home. One of the prioritized information items displayed at the first agent workstation 22 may indicate that the cellular network serving the area where the customer lives has been having network problems that have just recently been resolved. The service agent may then inform the customer of the network problems in their location, explain that the problems have now been fixed, and apologize for any inconvenience.

Figure 4:
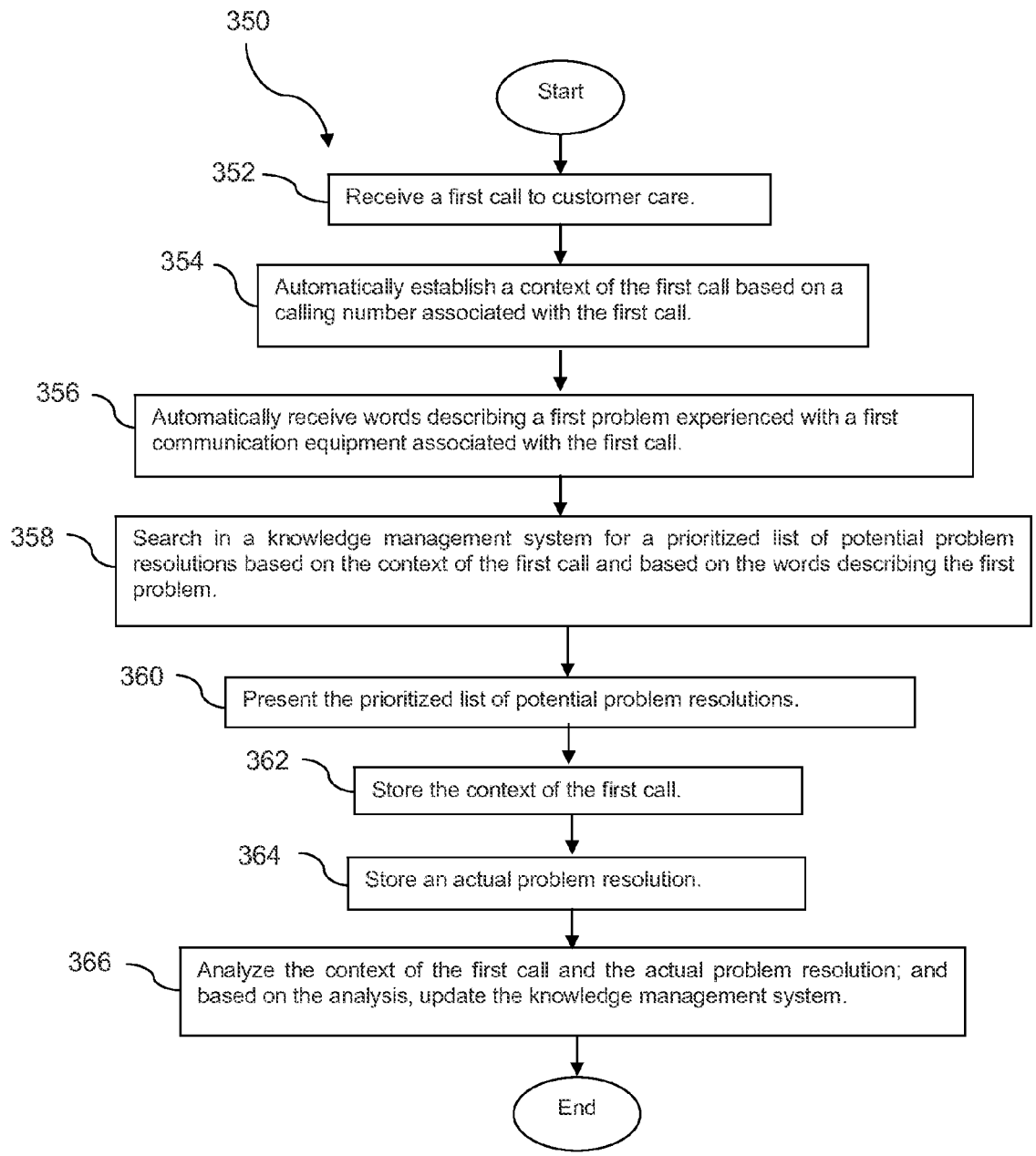
FIG. 4 is a flow chart of a method according to an embodiment of the disclosure.

Turning now to FIG. 4, a method 350 of providing customer care is described. At block 352, a first call to the first call center 20 is received. In an embodiment, the first call may be assigned to or transferred to a service agent using the first agent workstation 22. At block 354, a context may be automatically established based on a calling number associated with the first call. In an embodiment, the context may comprise one or more of information about a first communication equipment associated with the calling number, information about a communication service plan associated with the calling number, billing information about the account associated with the calling number, information about communications network operations used by the first communication equipment, and/or information retrieved from the agent management tool 40.

At block 356, words describing a first problem experienced with a first communication equipment associated with the first call may be automatically received. In an embodiment, the words describing the first problem may be one or more of words used by a first caller to describe the first communication problem with the first communication equipment, words used by the first caller to describe some symptoms of the first communication problem with the first communication equipment, or words entered or selected by a first call agent working at the first agent workstation 22 to describe the first communication problem with the first communication equipment. The words describing the first problem may further be words retrieved from a synonym library 204 associated with at least some of the words used by the first caller or the first call agent working at the agent workstation 22 to describe the first communication problem, words identified by the inference engine 206 to be associated with at least some of the words used by the first caller or the first call agent working at the agent workstation 22 to describe the first communication problem, and/or words selected by the first call agent from a list that may be presented on a display at the first agent workstation 22. In an embodiment, the list may be automatically generated based on the contextual information generated at block 354. For example, the first calling number associated with the first caller may be used to automatically retrieve contextual information indicating that the first communicating equipment is a cell phone made by manufacturer "A" and that it is a model "X". The hub application 14 may retrieve a list comprised of at least some words that were used by a second caller to describe the symptoms of a second communication problem with a second communication equipment that was also made by manufacturer "A" and that was also a model "X".

At block 358, search in a knowledge management system for a prioritized list of potential problem resolutions based on the context of the first call established at block 354, and based on the words describing the first problem received or selected at block 356. In an embodiment, the knowledge management system may comprise the problem resolution server 12, the hub application 14, and the data store 16. The knowledge management system may further comprise one or more of the content server 32 and the data store 34, the network management system 50 and the data store 52, the service plan accounts server 36 and the data store 38, the billing server 44 and the data store 46, the agent management tool 40 and the data store 42, a social network site 48, and/or other tools 54 and the data store 56 which are coupled by the network 18 to the problem resolution server 12 and the hub application 14.

At block 360, present the prioritized list of potential problem resolutions found at block 358. In an embodiment, the prioritized list of potential problem resolutions may be presented on a display at the first workstation 22 in a format that is selected or assigned based on one of the identity of the first call agent, the identity of a group in which the first call agent works, or the identity of an organization to which the first call agent or the first agent workstation 22 belongs.

At block 362, store the context of the first call established at block 354. In an embodiment, the context may be stored in one or more of a data store 16 associated with a problem resolution server 12, the knowledge dictionary 202, the synonym library 204, the data store 42 associated with the agent management tool 40, the data store 34 associated with the content server 32, or the data store 56 associated with other tools 54.

At block 364 store an actual problem resolution found at block 358. In an embodiment, the stored actual problem resolution was used to successfully resolve the first problem experienced with the first communication equipment associated with the first call. For example, the actual problem resolution may have been teaching the customer how to use a feature on their mobile device, telling the customer how to reset a setting on their mobile device, ordering a replacement mobile device, or persuading the customer that there is not a problem with their mobile device. In an embodiment, the actual problem resolution may be stored in one or more of the data store 16 associated with the problem resolution server 12, the knowledge dictionary 202, the synonym library 204, the data store 42 associated with the agent management tool 40, the data store 34 associated with the content server 32, or the data store 56 associated with other tools 54. In an embodiment, the stored actual problem resolution for the first problem may be tagged with information or metadata that the hub application 14 may use for subsequent searches. In an embodiment, the metadata tags may comprise one or more of keywords which describe symptoms of the first problem with the first communication equipment, contextual information associated with the first problem with the first communication equipment, any information which may help match the stored actual problem resolution to a second problem with a second communication equipment, or any information which may help prioritize potential solutions for a second communication problem with a second communication equipment.

At block 366, analyze the context of the first call and the actual problem resolution, and update the knowledge management system based on the analysis. In an embodiment, the analysis may include one or more of the total amount of time that was taken to resolve the first communication problem, the accuracy or degree of success of the problem resolution, the contextual information that was used to identify the problem resolution, any words or synonyms or inferred words that were used to identify the problem resolution, or any content external to the knowledge management system that was used at least in part to resolve the first communication problem with the first communication equipment.

Figure 5:
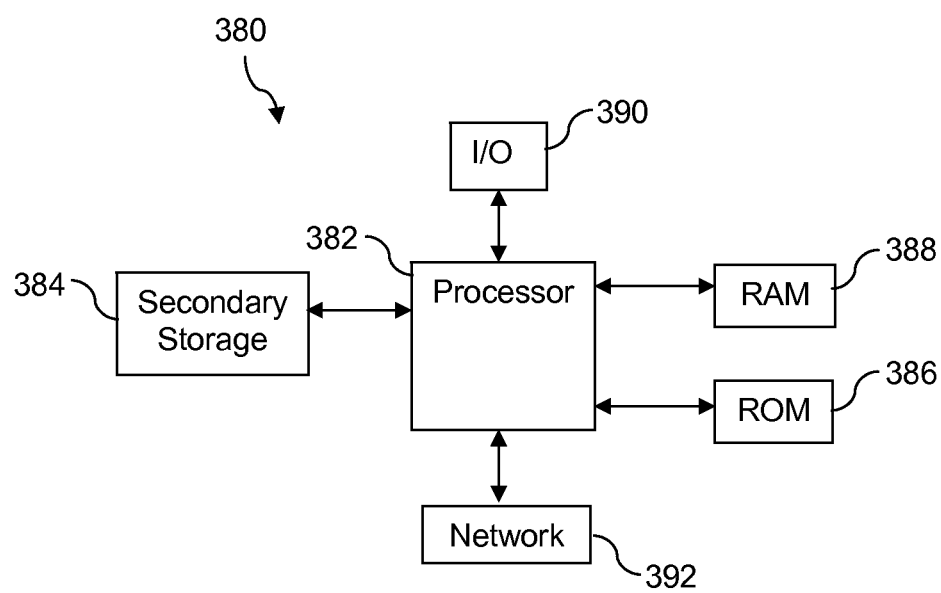
FIG. 5 illustrates an exemplary computer system suitable for implementing the several embodiments of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as non-transitory storage and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A call center problem resolution system, comprising:
a knowledge dictionary, wherein the knowledge dictionary comprises information about communication networks and communication devices, wherein the information is tagged for searching based on a context of a call;
a computer system comprising at least one processor and a memory;
a data store coupled to the computer system; and
an application stored in the memory that, when executed by the processor,
receives call information comprising a calling number, wherein the call is directed to a call center,
retrieves communication equipment information based on the calling number,
retrieves communication service plan information based on the calling number,
retrieves communication network operations information based on the communication service plan information,
receives a plurality of words describing a problem experienced by communication equipment associated with the calling number,
based on at least one of the plurality of words describing the problem, the communication network operations information, the communication service plan information, the communication equipment information, or searching the knowledge dictionary, identifies a plurality of information items,
determines a prioritized order of the plurality of information items based on an identity of an information source that contributed a corresponding information item of the plurality of information items and at least one of an identity of a call agent handling the call, how quickly previous calls with similar symptoms were resolved, or how successfully previous calls with similar symptoms were resolved, and
presents the plurality of information items in the prioritized order to the call agent.

2. The system of claim 1, wherein the communication equipment information comprises at least one of an equipment manufacturer identity, an equipment model identity, an electronic serial number (ESN), or a mobile subscriber identity (MSID).

3. The system of claim 1, wherein the communication network operations information indicates a status of a communication network providing communication service to a communication device associated with the calling number.

4. The system of claim 1, further comprising a synonym library, wherein the application searches the synonym library using the words describing the problem, and wherein the application identifies the plurality of information items based additionally on synonyms of the words describing the problem.

5. The system of claim 1, wherein the application further receives a description of an actual problem resolution, stores the context of the call, stores the actual problem resolution, and wherein the application identifies the plurality of information items based further on stored call contexts and stored problem resolutions.

6. The system of claim 5, wherein the context of the call comprises at least one of the calling number, the communication equipment information, the communication service plan information, the communication network operations information, and the words describing the problem.

7. A method of addressing problem reports in a call center, comprising:
   receiving a call reporting a communication problem;
   determining, by an application stored on the non-transitory computer readable memory and executed by a processor, a calling number of the call based on a call origination message;
   retrieving, by the application, communication equipment information based on the calling number from a data store containing information about communication equipment provisioned to receive communication service;
   retrieving, by the application, communication service plan information based on the calling number from a data store containing information about communication customer accounts;
   retrieving, by the application, billing information based on the calling number from a data store containing information about a current account balance associated with the calling number;
   retrieving, by the application, communication network operations information from a network management system based on the communication equipment information;
   receiving, by the application, a plurality of words at least in part describing a communication problem;
   identifying, by the application, a plurality of information items based on at least one of the plurality of words, the communication equipment information, the billing information, the communication network operations information, the service plan information, or searching a knowledge dictionary, wherein the knowledge dictionary comprises information about communication networks and communication devices, and wherein the information is tagged for searching based on a context of the call;
   determining, by the application, a prioritized order of the plurality of information items based on an identity of an information source that contributed a corresponding information item of the plurality of information items and at least one of an identity of a call agent handling the call, how quickly previous calls with similar symptoms were resolved, or how successfully previous calls with similar symptoms were resolved; and
   presenting, by the application, the information items in the priority order.

8. The method of claim 7, wherein the communication equipment is one of a mobile phone, a personal digital assistant (PDA), a media player, and a wireless interface card.

9. The method of claim 7, wherein the information in the knowledge dictionary comprises information submitted by call center agents.

10. The method of claim 9, further comprising evaluating, by the application, the utility of information submitted by call center agents and associating the evaluation with the information submitted by each call center agent.

11. The method of claim 7, wherein identifying the information items is based at least in part on searching a synonym library to identify synonyms of the words describing the communication problem and searching the knowledge dictionary based further on the synonyms identified.

12. The method of claim 7, further comprising identifying, by the application, the call agent assigned to handle the call, wherein identifying the information items is based at least in part on a profile associated with the call agent.

13. The method of claim 12, wherein the information items are presented based at least in part on the profile of the call agent.

14. A method of providing customer care, comprising:
   receiving a call to customer care;
   based on a calling number associated with the call, automatically establishing, by an application stored on the non-transitory computer readable memory and executed by a processor, a context of the call;
   automatically receiving, by the application, words describing a problem experienced with a communication equipment associated with the call;
   based on the context of the call and based on the words describing the problem, searching, by the application, in a knowledge management system for a prioritized list of potential problem resolutions, wherein the knowledge management system comprises a knowledge dictionary, wherein the knowledge dictionary comprises information about communication networks and communication devices, and wherein the information is tagged for searching based on a context of the call;
   determining, by the application, a prioritized order of the potential problem resolutions based on an identity of an information source that contributed a corresponding potential problem resolution of the potential problem resolutions and at least one of an identity of a call agent handling the call, how quickly previous calls with similar symptoms were resolved, or how successfully previous calls with similar symptoms were resolved;
   presenting, by the application, the potential problem resolutions in the prioritized order;
   storing, by the application, the context of the call;
   storing, by the application, an actual problem resolution;
   analyzing, by the application, the context of the call and the actual problem resolution; and
   updating, by the application, based on the analysis, the knowledge management system.

15. The method of claim 14, wherein the context of the call comprises at least one of a communication service account identity associated with the calling number, an account balance associated with the calling number, a service plan associated with the calling number, and a network operation condition at the time of the call.

16. The method of claim 14, wherein analyzing the context of the call and the actual problem resolution comprises determining a correlation of the context of the call with the actual problem resolution based at least in part on a history of previous calls to customer care.

17. The method of claim 14, wherein the knowledge management system comprises information about a communication network and information about communication equipment, wherein the information is tagged for association, and wherein the knowledge management system is searched at least in part based on the association of the words describing the problem and the tags associated with the information.

18. The method of claim 1, wherein the prioritized plurality of information items is presented in a format based on one of the identity of the call agent handling the call, an identity of a group in which the call agent handling the call works, or an identity of an organization to which the call agent handling the call belongs.

\* \* \* \* \*